US005795388A

United States Patent [19]

Oudard

[11] Patent Number: 5,795,388

[45] Date of Patent: Aug. 18, 1998

[54] DEVICE FOR DISTRIBUTING PULVERULENT SOLIDS ONTO THE SURFACE OF A SUBSTRATE FOR THE PURPOSE OF DEPOSITING A COATING THEREON

[75] Inventor: Jean-Francois Oudard, Thiescourt, France

[73] Assignee: Saint-Gobain Vitrage, Courbevoie, France

[21] Appl. No.: 534,800

[22] Filed: Sep. 27, 1995

[30] Foreign Application Priority Data

Sep. 27, 1994 [FR] France .................................. 94 11504

[51] Int. Cl.$^6$ .............................. B05B 7/00; B05B 7/04; B65G 53/34

[52] U.S. Cl. .......................... 118/308; 118/315; 406/194; 406/191; 239/433

[58] Field of Search .................................... 406/181, 153, 406/194, 191; 118/308, 313, 315; 239/113, 552, 311, 548, 398, 407, 433; 427/180, 421; 222/478

[56] References Cited

U.S. PATENT DOCUMENTS 4,576,526 3/1986 Miller et al. .............................. 222/56

4,808,043 2/1989 Le Marrec et al. .................... 406/181

FOREIGN PATENT DOCUMENTS 0 130 919 1/1985 European Pat. Off. .

19502741 7/1996 Germany .

*Primary Examiner*—Laura Edwards

*Assistant Examiner*—Calvin Padgett

*Attorney, Agent, or Firm*—Oblon, Spivak, McClelland, Maier & Neustadt, P.C.

[57] ABSTRACT

A device for distributing pulverulent solids in suspension in a gas, for the purpose of depositing a coating, notably by pyrolysis, on a moving substrate (1), includes a distribution nozzle (24), the walls of which define a cavity (11) which terminates in a longitudinal distribution slit (13) and a principal powder feed duct (6) equipped with a distribution portion (7). A plurality of secondary powder feed ducts (8), connected to this principal duct by the distribution portion, enables the cavity (11) of the nozzle (24) to be supplied with powder over its entire length. At least a portion of the secondary ducts (8) is equipped with at least one pneumatic device adapted for modulating the flow rate of the powder-gas suspension which each of the secondary ducts concerned is intended for carrying.

8 Claims, 2 Drawing Sheets

DEVICE FOR DISTRIBUTING PULVERULENT SOLIDS ONTO THE SURFACE OF A SUBSTRATE FOR THE PURPOSE OF DEPOSITING A COATING THEREON

BACKGROUND OF THE INVENTION

1. Field of the Invention

This invention concerns a distribution device for distributing pulverulent solids onto the surface of a substrate, notably of glass, for the purpose of coating it with thin films capable of giving it optical, thermal or electrical properties.

2. Description of the Related Art

This device makes possible, notably, the deposition of thin films by a technique known as powder pyrolysis, consisting of projecting said pulverulent solids (in general organometallic compounds), in suspension in a gas, towards a substrate heated to high temperature in such a way that they decompose (generally in the form of metallic oxide) on contact. The substrate may have the form of a continuous glass ribbon, known as float glass, at the outlet from the float enclosure for the glass, the device then usually comprising a nozzle having a cavity which passes right across it and terminates in a distribution slit above the ribbon and transversely to its axis of motion, the nozzle being equipped with suitable feed means for powder.

It is thus possible to produces continuously, thin films having as a general rule a high adhesion to the substrate and satisfactory quality and satisfactory durability.

The float glass ribbon to be coated (or any other substrate of large dimensions that it is desired to cover) does however usually have a width of at least 2 meters, notably of the order of 3 to 4 meters. It is therefore over this width, which is considerable, that the nozzles must distribute the gas/powder suspension in the most homogeneous possible way in order to assure, at least transversely to the axis of travel of the ribbon, a certain constancy in the quality and/or the thickness of the deposited coating. Many studies have already been carried out, directed either towards the design itself of the nozzle, or to the manner of feeding powder to it, so as to assure this homogeneity to the maximum.

Thus, Patent EP-B-0 130 919 has developed an effective distribution means enabling a vein of powder in suspension carried in a single supply duet to be fairly uniformly subdivided into a plurality of veins of powder carried in as many secondary ducts feeding the nozzle over its entire width by means of feed elements termed injectors, into which they lead. It is, however, difficult to guarantee that each of these veins in perfectly identical with all the others in terms of flow rate of powder transported, and that the assembly of all the veins will be able to "merge" into a perfectly homogeneous powder current at the position of the distribution slit of the nozzle.

This is why the Patents EP-B-0 125 153 and EP-B-0 374 023 have proposed that this feed method be completed by providing each of the supply means with pressurized gas in the cavity with the aim of facilitating homogenizing the flow of the powder-gas suspension issuing from the injectors through the nozzle, without managing to eliminate completely any risk of irregularity in thickness in the deposited film and to "correct" the possible slight disparities between the different veins of gas arriving in the injectors.

The Patent EP-B-0 392 902 then proposed a device enabling the relative positions of the injectors disposed in line at the entry to the nozzle to be automatically modified, by moving apart or bringing nearer together the injectors concerned as soon as a local variation in thickness is detected in the deposited coating "downstream" of the nozzle. This solution gives interesting results, but is not yet entirely optimum, firstly because it can appear somewhat complicated to carry out, but then and above all because it attempts to compensate the possible disparities in flow rate of the secondary veins without really correcting them.

SUMMARY OF THE INVENTION

The invention has as its objective to improve still further the method of functioning of the distribution devices for powder of this type, and notably to achieve an optimization of the homogeneity of the flow of the powder-gas suspension through the nozzle, without sacrificing too much the simplicity of operation, in order to obtain coatings of quality, particularly in terms of uniformity of thickness.

The invention has as its subject a distribution device for pulverulent solids in suspension in a gas, for the purpose of depositing a coating, notably by pyrolysis, on a moving substrate, notably of the float glass ribbon type. This device comprises, on the one hand, a distribution nozzle having walls that define a cavity which terminates in a longitudinal distribution slit. It comprises, on the other hand, a principal feed duct for powder equipped with a distribution means. A plurality of secondary supply ducts for powder connected to this principal duct by the distribution means enables the cavity of the nozzle to be fed with powder over its entire length. According to this invention, at least a portion of the secondary ducts is equipped with at least one pneumatic means adapted for modulating the flow rate of the powder-gas suspension that each of the secondary ducts concerned is intended for carrying. Preferably, each of the ducts is equipped with such a pneumatic means. This solution offers two major advantages: on the one hand, by modulating the flow rate in each of the ducts one can directly correct the disparities in flow rate that may exist between the veins of gas-powder mixture that they transport into the nozzle, and thus ensure a very uniform distribution in the powder feed at the level of the nozzle, over the entire length of its cavity. On the other hand, to make use of a pneumatic means and not mechanical means for carrying out these modulations of flow rate is very advantageous. In effect, a mechanical means of the valve type functions on the principle of partial obturation of a duct which, in the case of a powder flow, causes local, sudden accumulations of powder, and clogging or blocking which can cause, in sudden and uncontrolled manner, very high losses of head in the flow.

A pneumatic means, in contrast, enables a flow of powder-gas mixture to be modulated in a fine and controlled manner and can be regulated with very short response times with appropriate regulating means, which can be manual or automatic. These means, if chosen automatic, may advantageously form part of a control loop, governed by a control unit connected to at least one means for measuring quality or thickness on the costing deposited on the substrate, by means of the distribution nozzle. In the case of a float glass ribbon, the regulation in powder flow rates of the secondary ducts may be performed continuously by very rapidly adjusting the flow rate of the appropriate secondary duct or ducts by the use of their pneumatic means as soon as a transverse variation in thickness in the coating deposited on the ribbon just downstream of the nozzle is detected. By using, for example, preestablished nomograms indicating the correspondence between a given local variation in thickness and a variation in adjustment of the appropriate pneumatic means of the secondary duct in question to rectify it, there is no need to measure precisely the flow rates of the powder-gas mixture in the ducts and the deviations that may occur in them, and it is possible simply to make a correlation between the variations in thickness that are the consequence of these deviations and the adjustments of the pneumatic means to be performed.

These pneumatic means may be present simply in the form of auxiliary feed ducts leading into the secondary ducts, which auxiliary feed ducts are advantageously equipped with a manual or automatic adjustment means for the flow rate or pressure of the gas, using, for example, valves. In so far as they carry only gas, this type of mechanical control means does not give any problem. These supplies thus introduce into the flow of the powder-gas mixture of the secondary ducts a gas jet, the characteristics of which are controlled so as to create there a controlled loss of head, enabling the flow rate to be reduced there to a greater or lesser extent, when necessary. By the use of an appropriate distribution means, the quantity of powder that is no longer carried by the duct because of this created reduction in flow will be able to distribute itself homogeneously over all the secondary ducts.

These secondary ducts may advantageously comprise piping, preferably flexible piping, connected to the distribution means of the principal feed duct, the ends of which piping, leading into the inlet of the cavity of the nozzle, are constituted of feed elements termed rigid "injectors", preferably of metal. The auxiliary gas feed means may then lead into the secondary ducts at any point, either at the level of these (flexible) pipings, "downstream" of the distribution means of the principal duct, or in proximity or within the nozzle, notably at the level of the piping-injector junction or at the level of the injector itself. It is this latter configuration which is the most favourable because the injector, being rigid, allows an easy and reliable "branched" connection to be made to the auxiliary gas feed.

One preferred form of embodiment of the invention thus consists of a distribution device, in which each of the secondary ducts intended for carrying the powder-gas suspensions is provided, at its end, with an injector, the injectors being uniformly disposed in a line within the inlet orifice of the cavity of the nozzle over its entire length, and being all equipped with a variable flow rate auxiliary gas inlet. In addition, the cavity of the nozzle is also provided with means for injecting gas under pressure, for the purpose of entraining the powder-gas suspension emitted by the injectors through the cavity, these injection means being preferably disposed symmetrically on either side of the line of injectors. Thus, the feed of powder to the nozzle is optimized in two ways. It is first corrected "at source" by the pneumatic means of the invention, making it possible to eliminate or at the very least to attenuate very significantly all the disparities in flow between the jets of powder-gas mixture emitted into the nozzle by the injectors. It is then homogenized, in the nozzle, by means of the pressurized gases which will enable the plurality of individualized jets of mixture flowing through the nozzle to be "transformed" into a "curtain" of powder that is uniform on leaving the transverse slit.

The invention also has as its object the method of using the device described above, and notably the various ways of controlling and regulating the pneumatic means with which the secondary ducts are equipped. When these pneumatic means are present in the form of auxiliary gas inlets leading into the ducts, it is thus possible to regulate each of the flow rates of jets of auxiliary gas separately, and within a range of flow rates that may be, for example, anywhere from 0 to 100% of a predetermined flow value. It is necessary, in fact, for these gas jets to have a "braking" action on the powder flow through the duct, in order to create there a loss of head and not a suction, which would cause an acceleration of the flow. The flow rates, speeds and directions of injection of these jets of auxiliary gas in relation to those of the flow of powder-gas mixture must be carefully selected.

A first possibility is to operate in "on/off" manner. If any local disparity in the flow rates through the ducts, manifesting itself by a local variation in thickness of the coating, is detected, the flow rate of these jets of auxiliary gas is zero. If a disparity appears, causing locally excess thicknesses in the coating, the pneumatic means of the secondary duct or ducts involved intervene, to deliver a jet of auxiliary gas of appropriate flow rate which cannot exceed a certain value, in order to reduce sufficiently the flow of powder of the duct or ducts to eliminate this excess thickness.

A second possibility is to cause the entirety of the pneumatic means to operate continuously, which all emit, when no disparity is detected, a jet of auxiliary gas of given flow rate. They then all exert a certain permanent "braking" effect on the flows of powder-gas mixture through the ducts, which can be compensated, if desired, by accordingly adapting the flow of powder-gas mixture through the principal feed duct. In this way it is possible to perform the regulation of the flow rate of the jets of auxiliary gas around this given value of flow rate. This method of operation is more flexible and gives a wider margin of error, because it is equally possible to rectify local excess thicknesses of coating (by increasing the emission flow rate of the appropriate auxiliary gas jet) as well as local reductions in thickness of said coating (by decreasing in this case the emission flow rate of the appropriate auxiliary gas jet).

In this method of operation, it is advantageous for the value of flow rate, about which the flow of each of the jets of auxiliary gas is regulated, to be approximately 20 to 60% of the mean gas flow rate of the powder-gas suspension carried by each of the secondary ducts. Preferably, a value of approximately 50% is chosen, with a regulation of the flow rate of each of the jets of auxiliary gas of ±50% about this value. The term "mean" flow rate is to be understood to mean their theoretical flow rate where no disparity of flow rate between ducts exists.

As mentioned above, the simplest and most technique is to regulate these jet flow rates of auxiliary gas, not as a function of the deviations evaluated quantitatively between the flow rates of the secondary ducts, which would be difficult to carry out, but directly as a function of the variations in thickness detected in the coating "downstream" of the distribution nozzle. In this way the variations in flow rate are indirectly corrected.

The device and the method of use of this device may advantageously be employed for the purpose of depositing coatings based upon metallic oxide, by pyrolysis onto a ribbon of hot float glass, notably coatings of doped oxides of the $SnO_2$:F type, for example from a powder or dibutyl tin difluoride (D.B.T.F.) or of the ITO type from indium formate powder and dibutyl tin oxide.

BRIEF DESCRIPTION OF THE DRAWING

The details and advantageous characteristics of the distribution device according to the invention will now become apparent from a non-limiting form of embodiment, illustrated with the help of the following figures.

DETAILED DESCRIPTION OF THE PREFERRED EMBODIMENT

Figure 1:
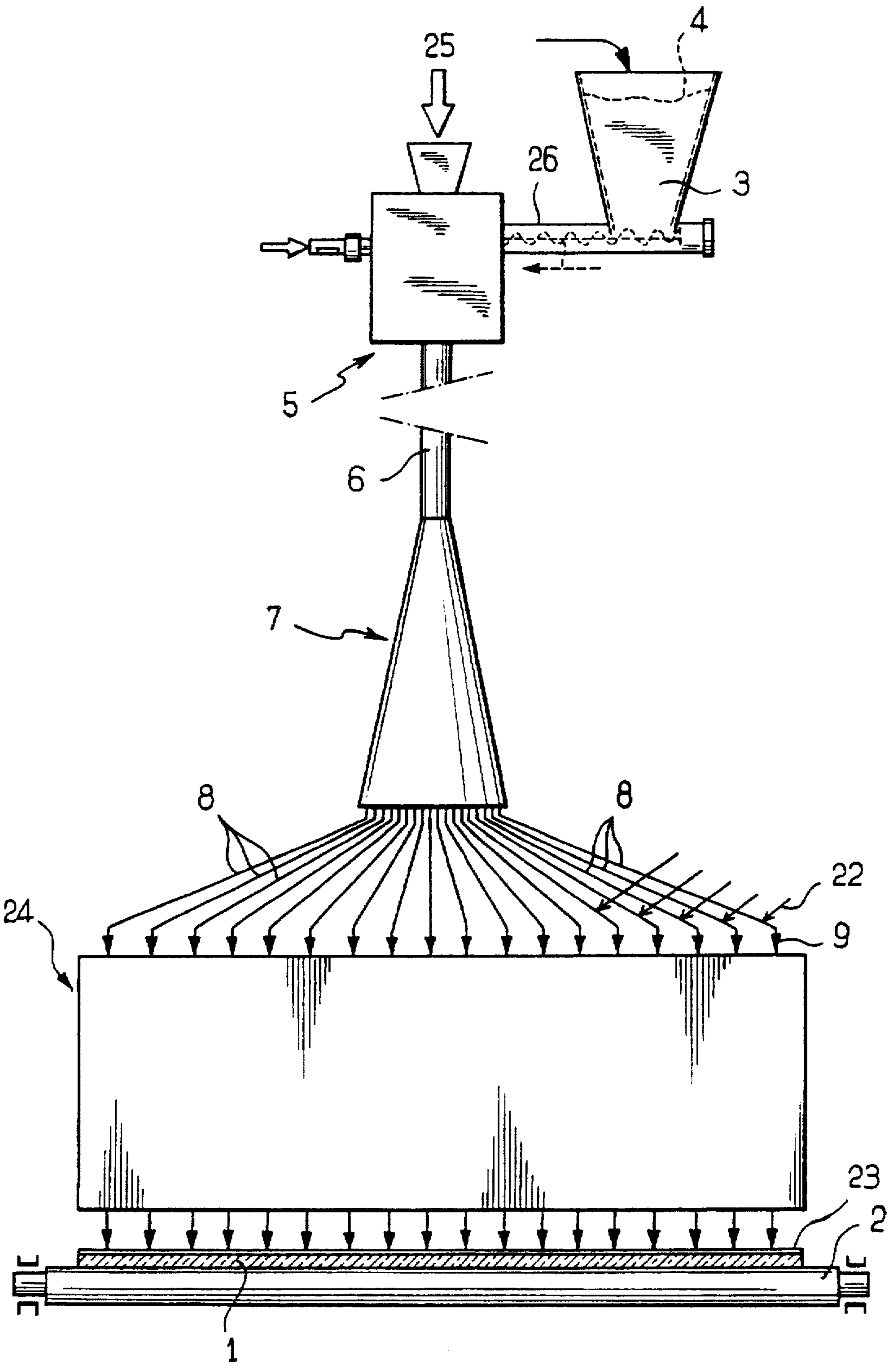
FIG. 1 is a schematic general view of a deposition installation for a coating by pyrolysis of powder onto a substrate.

The installation as shown generally in FIG. 1 enables pulverulent solids of all types to be distributed in a uniform manner onto various substrates, notably those of large dimensions. Within the framework of this non-limiting example, it is used for distributing a powder of organometallic compounds onto a ribbon 1 of hot float glass at the exit from the float bath enclosure, this ribbon travelling over a bed of rollers 2 along a given axis at a uniform speed. The powder thus brought into contact with the surface of the hot glass decomposes there to leave a coating based upon metallic oxide or oxides.

This installation is a simplification of that described in European Patent EP-B-0 130 919, referred to above, in so far as it comprises an addition the pneumatic means 22 specific to the present invention.

Figure 2:
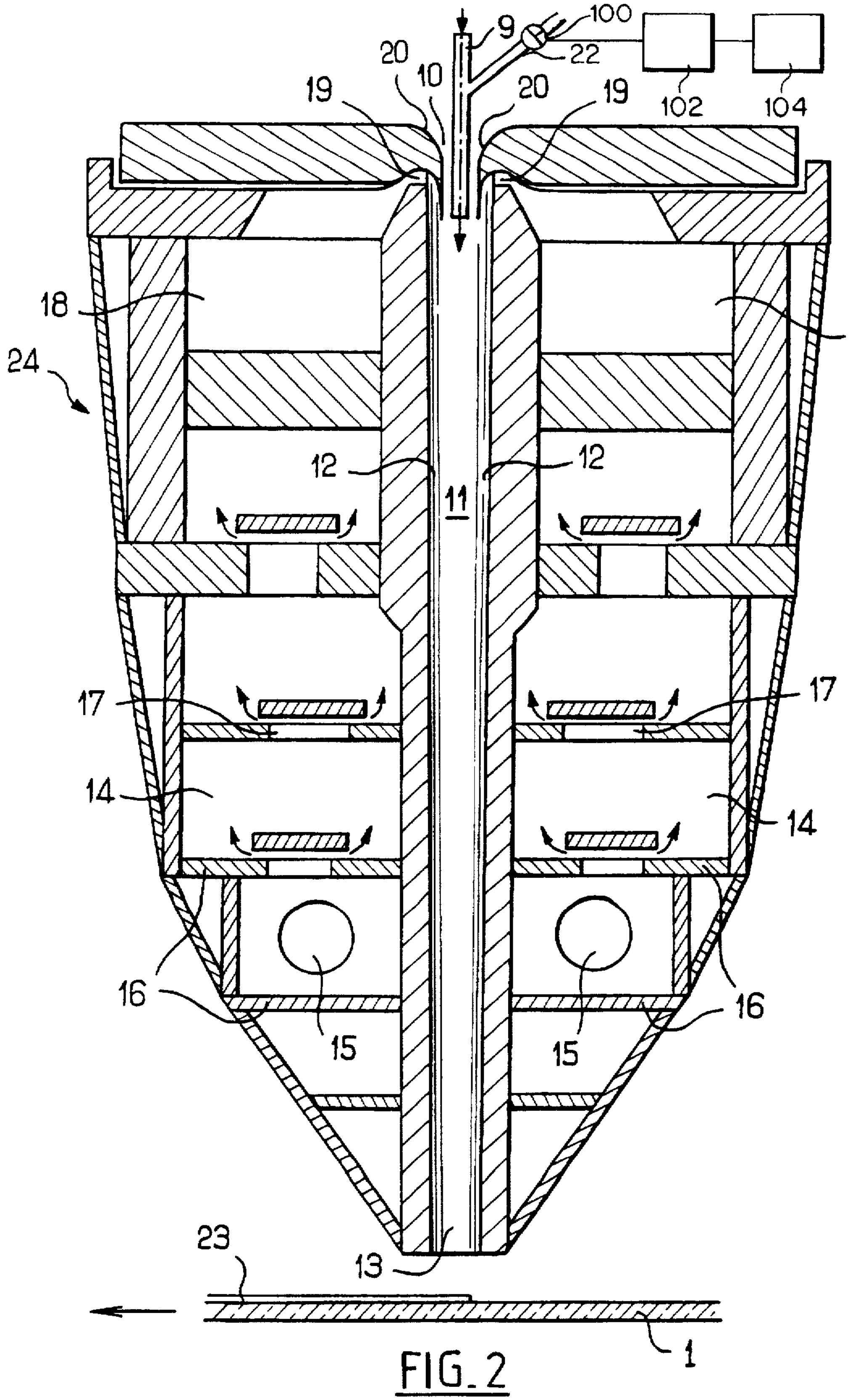
FIG. 2 is a cross-sectional view through the distribution nozzle of the installation according to FIG. 1.

The nozzle 24 of the installation, shown in FIG. 2, is likewise an optimization of that described in Patent EP-0 374 023. For more information concerning the functioning of the installation in general and of the nozzle in particular, reference may therefore advantageously be made to these two Patents, and to other previously mentioned Patents.

The installation according to FIG. 1 shows therefore a storage hopper 3 for powder 4 to be distributed, a mixer 5 in which the powder-gas mixture is produced, in general by mixing with air, for the purpose of forming a suspension that will be as homogeneous as possible of the powder in the gas. This is accomplished by means of an air inlet 25 and a screw 26 supplied with powder from the hopper 3. A principal inlet duct 6 supplies the powder-gas suspension from the outlet of the mixer 5, a distribution means 7 subdivides the single vein of powder-gas suspension fed through the duct 6 into a plurality of secondary veins as uniform as possible, a plurality of flexible secondary ducts 8 carry these veins to the distribution nozzle 24. This nozzle is disposed transversely to the axis of travel of the glass ribbon 2 and defines a transverse cavity, the length of which corresponds to the width of the ribbon to be coated. The secondary ducts 8 feed into metal injectors 9, disposed in line at the entry to this cavity.

If reference is now made to FIG. 2, there can effectively be seen one of these injectors 9 projecting a vein of gas-powder mixture into the inlet 10 of the cavity 11 defined by the inner wall faces 12 of the nozzle, these wall faces being plane and slightly convergent to the distribution slit 13 situated a few millimeters from the surface of the glass ribbon 1. Injection means for gas under pressure are, furthermore, provided on either side of the line of the injectors 9, in order to facilitate the distribution of powder as a "curtain" and the entrainment of the jets of powder-gas suspension issuing from the injectors 9. These means are formed by a series of chambers 14, situated symmetrically within the nozzle body and connected by a nozzle pipe 15 to a gas source, generally an air source. These chambers are connected to one another by a partition 16 forming a bracing, equipped with a means for passage of the gas, for example by means of porous materials and through orifices 17. The chambers 18 situated in the upper part of the nozzle lead into the cavity 11 through slits 19 in proximity to the injectors 9, in such a way as to inject the pressurized gas substantially parallel to the wall faces 12, the slits being limited by lips 20, of appropriate configuration.

According to the invention, each of the injectors 9 is constituted schematically of a hollow metal cylinder, into which each of the secondary ducts 8 leads in sealed manner. These injectors comprise, in addition, an inlet for gas of the air type in the form of an auxiliary duct 22. Preferably the angle between injector 9 and duct 22 is such that the jet of powder-gas mixture in the injector and the jet of gas which the duct 22 can emit into the injector 9 make between them an angle $\alpha$ of between 5°and 90°, preferably of approximately 30°. It is in fact preferable for this angle to remain below 90° so as to avoid any risk of traces of powder infiltrating into the duct 22, traces which could, notably, perturb the proper functioning of the flow regulation means with which this duct is equipped. Each auxiliary duct 22 is fed from an appropriate gas source, not shown.

It is possible to modulate the flow rate of the gas jets carried by each of the ducts 22 into the powder-gas stream of each of the injectors in an individualized manner by means of control loops. Each of the ducts, connected to a gas source notably an air source, outside the nozzle, is equipped with a flow regulating means of the electrically operated valve type. This regulating means 100 (for example of the flow-meter type associated with a solenoid valve) is governed by a control unit 102 as a function of the variations in thickness detected downstream of the nozzle on the coating 23. This detection may be performed continuously or at given intervals of time by means of one or more thickness measuring means 104 of the reflectometer type (either one reflectometer mounted movably above the glass ribbon in order to "scan" the width of the coating, or several reflectometers disposed in line above the ribbon).

The method of functioning of the nozzle 24 is explained by means of an example of embodiment, consisting of depositing a film of $SnO_2$:F of 200 nm thickness from a dibutyl tin difluoride powder (D.B.T.F.). The mass flow rate of D.B.T.F. powder carried through the principal feed duct 6 is between 3 and 10 kg/hour/linear meter of nozzle. The volumetric flow rate of gas, in which it is in suspension, is from 3 to 80 $m^3$/hour/linear meter of nozzle. The flow of gas under pressure, injected through the slits 19 into the cavity, is between 200 and 500 $m^3$/h/linear meter of nozzle.

If the distribution means 7 and the design of the ducts 6 and 8 were perfect, each secondary duct would carry a gas vein, of which the mass flow rate of D.B.T.F. and volumetric flow rate of gas would be exactly equal to the flow rates of these components in the suspension carried through the principal feed ducts divided by the number of secondary ducts. Now it has been found that deviations in flow rate can appear between the jets of powder-gas mixture issuing from each of the injectors 9, these deviations resulting in local additional thicknesses or, in contrast, local reductions in thickness of the coating deposited by comparison with the desired mean thickness of 200 nm. These transverse variations in the thickness of the coating are prejudicial to its quality because they may, notably, create rather inelegant optical defects of the iridescence type.

In normal operation, in the absence of detection by the reflectometer or reflectometers of a local variation in thickness of coating exceeding a given tolerance threshold, for example not more than 3% deviation in relation to the desired mean thickness of 200 nm, there flows continuously through each of the injectors 9 a powder-gas stream originating from the secondary duct 8, having a volumetric flow rate of gas of approximately 2 $m^3$/h and a jet of gas emitted by the auxiliary duct 22 with a given gas volumetric flow rate, notably of approximately 1 $m^3$/h.

As soon as a reflectometer detects a local decrease in thickness passing through the predefined threshold of 3%, the control unit governs the valve of the duct or ducts 22 of the injectors 9 involved in order to decrease the flow rate of the auxiliary gas jet. In the case of an excess coating thickness, it will be necessary to increase this flow rate. Thus, starting from a mean valve of 1 $m^3$/h, the flow rate of each of the jets of auxiliary gas may vary between, for example, 0.5 and 1.5 $m^3$/h. The more the flow rate of auxiliary gas rises, the more it will decrease the flow rate of the powder-gas stream, and therefore will locally decrease the thickness of the deposited coating. The control unit (or the operator) may use nomograms giving the direct correspondences between the variation in thickness in the coating and the variation in flow rate in the ducts 22, without even having to measure accurately the flow rates of powder that pass through the ducts 8 and then the injectors 9.

It should be noted that it is important that these auxiliary gas jets, raking into account the envisaged flow rates and the diameters of the ducts 22, shall maintain a sufficiently low speed by comparison with that of the powder-gas stream through the injectors 9 to prevent a suction being created, which would abruptly entrain it instead of modulating its flow rate.

Any irregularity in the thickness of the coating may thus be rapidly corrected, remotely, by hand, or automatically or semiautomatically. The regulation of the flow rate of the stream of powder-gas suspension originating from each of the secondary ducts 8 will be performed by the auxiliary gas jet of each of the ducts 22, without any problem of throttling or clogging of the secondary duct, nor any incident prejudicial to the feed of the other secondary ducts. Thus if, as a result of the adjustment of the auxiliary gas jet, the flow rate of powder through the secondary duct 8 is reduced ad hoc for the purpose of rectifying an excess thickness in the coating, the "excess powder" not supplied through the duct in which the flow rate has been decreased will be distributed uniformly over all the other ducts at the distribution means.

Furthermore, it is apparent from the foregoing description that the manner of feeding powder utilizes the pneumatic means of the invention for the purpose of improving the uniformity in the thickness of the deposited coating. It would be equally possible, however, without departing from the scope of the invention, to use these pneumatic means for creating, this time in a voluntary and controlled manner, gradients in the thickness of the deposited coating at least transversely to the axis of travel of the substrate, if it should prove useful or advantageous to produce coatings having such characteristics.

I claim:

1. A device for distributing a pulverulent solid suspended in a gas onto a moving substrate, comprising:

a distribution nozzle defining a cavity terminating in an elongate distribution slit facing the substrate;

a powder feed system in flow communication with said distribution nozzle for feeding powder thereto, said powder feed system comprising a principal powder feed duct and a plurality of secondary powder supply ducts, each in flow communication with said principal feed duct at one end, and with said cavity of said distribution nozzle at positions spaced along the length of said slit at the other end; and a pneumatic device connected to at least one of said secondary powder supply ducts for pneumatically modulating a flow rate of powder in said at least one of said secondary powder supply ducts, wherein said pneumatic device comprises means for generating a controlled loss of head in said at least one of said secondary powder supply ducts, wherein said pneumatic device includes an auxiliary duct feeding a jet of gas into said at least one of said secondary powder supply ducts to form a powder-gas suspension, and wherein said means for generating a controlled loss of head comprises means for measuring a characteristic of the coating applied to the substrate; a control unit in communication with said measuring means for receiving signals from said measuring means; and a flow regulating valve in said auxiliary duct and in communication with controlled by said controller.

2. The device is of claim 1 wherein said pneumatic device connected to each of said secondary powder supply ducts.

3. The device of claim 1 wherein each said secondary ducts comprise a flexible duct part and a rigid injector with one end attached to said flexible duct part and the other end extending into the cavity of the distribution nozzle.

4. The device of claim 3 wherein said auxiliary duct feeds said jet of gas into said at least one of said secondary powder supply ducts adjacent said rigid nozzle.

5. The device of claim 1 wherein said substrate is a float glass ribbon.

6. The device of claim 1 wherein said auxiliary feed duct and said at least one secondary powder supply duct form an angle therebetween of between 5 and 90%.

7. The device of claim 1 wherein said auxiliary feed duct and said at least one secondary powder supply duct form an angle therebetween of 30%.

8. A device for distributing a pulverulent solid suspended in a gas onto a moving substrate, comprising:

a distribution nozzle defining a cavity terminating in an elongate distribution slit facing the substrate;

a powder feed system in flow communication with said distribution nozzle for feeding powder thereto, said powder feed system comprising a principal powder feed duct and a plurality of secondary powder supply ducts in flow communication with said cavity of said distribution nozzle at positions spaced along the length of said slit; and an auxiliary duct including a pneumatic device connected to at least one of said secondary powder supply ducts for pneumatically modulating a flow rate of powder in said at least one of said secondary powder supply ducts and creating a powder-gas suspension, wherein each of said secondary ducts comprise a flexible duct part and a rigid injector extending into the cavity of the distribution nozzle, and wherein said rigid injectors form a line at the inlet of said cavity of said distribution nozzle, and wherein said cavity of said distribution nozzle includes means for injecting gas under pressure disposed symmetrically at opposite sides of said line of rigid injectors for entraining the powder-gas suspension emitted by said rigid nozzle.

* * * * *